(12) United States Patent
Eickhoff

(10) Patent No.: US 8,932,780 B2
(45) Date of Patent: Jan. 13, 2015

(54) FUEL CELL

(75) Inventor: Steven J. Eickhoff, Brooklyn Park, MN (US)

(73) Assignee: Honeywell International Inc., Morristown, NJ (US)

( * ) Notice: Subject to any disclaimer, the term of this patent is extended or adjusted under 35 U.S.C. 154(b) by 669 days.

(21) Appl. No.: 12/705,383

(22) Filed: Feb. 12, 2010

(65) Prior Publication Data

US 2010/0151346 A1 Jun. 17, 2010

Related U.S. Application Data

(63) Continuation-in-part of application No. 12/335,352, filed on Dec. 15, 2008.

(51) Int. Cl.
*H01M 8/10* (2006.01)
*H01M 8/02* (2006.01)
(Continued)

(52) U.S. Cl.
CPC .......... *H01M 8/0252* (2013.01); *H01M 8/0239* (2013.01); *Y02E 60/528* (2013.01); *H01M 8/18* (2013.01); *H01M 8/0273* (2013.01);
(Continued)

(58) Field of Classification Search
USPC ........................................................ 429/479
See application file for complete search history.

(56) References Cited

U.S. PATENT DOCUMENTS

| 2,935,382 A | 5/1960 | Osborn et al. |
| 3,133,837 A | 5/1964 | Eidensohn |

(Continued)

FOREIGN PATENT DOCUMENTS

| DE | 19734259 | 2/1999 |
| EP | 1351329 | 10/2003 |

(Continued)

OTHER PUBLICATIONS

Aiello et al., "Production of Hydrogen from Cheical Hydrides Via Hydrolysis with Steam," International Journal of Hydrogen Energy, vol. 24, pp. 1123-1130, 1999.

(Continued)

*Primary Examiner* — Ula C. Ruddock
*Assistant Examiner* — Jacob Marks
(74) *Attorney, Agent, or Firm* — Schwegman Lundberg & Woessner, P.A.

(57) ABSTRACT

An example fuel cell assembly may include a proton exchange membrane (or membrane electrode assembly) that has a first major surface and a second major surface. An anode electrode, which may include a patterned metal layer with a plurality of apertures extending through the patterned metal layer, may also be provided. An anode gas diffusion layer secured to an anode adhesive frame may be situated between the anode electrode and the first major surface of the proton exchange membrane. A cathode electrode may, in some instances, include a patterned metal layer with a plurality of apertures extending through the patterned metal layer. A cathode gas diffusion layer secured to a cathode adhesive frame may be situated between the cathode electrode and the second major surface of the proton exchange membrane. In some instances a fuel cell assembly may be flexible so that the fuel cell assembly can be rolled into a rolled configuration that defines an inner cavity with open ends. A fuel pellet may be inserted into the inner cavity, and one or more end caps may be provided to cover and seal the open ends.

13 Claims, 10 Drawing Sheets

(51) Int. Cl.
   *H01M 8/18*     (2006.01)
   *H01M 8/06*     (2006.01)
   *H01M 8/00*     (2006.01)
   *H01M 8/24*     (2006.01)
   *H01M 4/86*     (2006.01)

(52) U.S. Cl.
   CPC ......... *H01M 8/1006* (2013.01); *H01M 8/0245* (2013.01); *H01M 8/065* (2013.01); *H01M 2008/1095* (2013.01); *H01M 8/004* (2013.01); *H01M 8/0232* (2013.01); *H01M 8/242* (2013.01); *Y02E 60/521* (2013.01); *H01M 4/8626* (2013.01)
   USPC .......................................... 429/480; 429/479

(56) References Cited

U.S. PATENT DOCUMENTS

| | | |
|---|---|---|
| 3,765,946 A | 10/1973 | Werner et al. |
| 3,931,395 A | 1/1976 | Beckert et al. |
| 3,994,697 A | 11/1976 | Burke |
| 4,048,385 A | 9/1977 | Regnaut |
| 4,138,089 A | 2/1979 | McCarthy |
| 4,155,712 A | 5/1979 | Taschek |
| 4,261,955 A | 4/1981 | Bailey, Jr. et al. |
| 4,407,904 A | 10/1983 | Uozumi et al. |
| 4,476,196 A | 10/1984 | Poeppel et al. |
| 4,476,197 A | 10/1984 | Herceg |
| 4,596,748 A | 6/1986 | Katz et al. |
| 4,629,664 A | 12/1986 | Tsukui et al. |
| 4,659,559 A | 4/1987 | Struthers |
| 4,826,741 A | 5/1989 | Aldhart et al. |
| 4,857,420 A | 8/1989 | Maricle et al. |
| 4,876,163 A | 10/1989 | Reichner |
| 4,906,536 A | 3/1990 | Simonton |
| 4,910,100 A | 3/1990 | Nakanishi et al. |
| 5,248,125 A | 9/1993 | Fritch et al. |
| 5,298,341 A | 3/1994 | Khandkar et al. |
| 5,372,617 A | 12/1994 | Kerrebrock et al. |
| 5,443,616 A | 8/1995 | Congdon |
| 5,449,697 A | 9/1995 | Noaki et al. |
| 5,534,363 A | 7/1996 | Sprouse et al. |
| 5,789,100 A | 8/1998 | Burroughs et al. |
| 5,804,329 A | 9/1998 | Amendola |
| 5,836,750 A | 11/1998 | Cabuz |
| 5,849,046 A | 12/1998 | Bailey |
| 5,851,689 A | 12/1998 | Chen |
| 5,861,221 A | 1/1999 | Ledjeff et al. |
| 5,948,558 A | 9/1999 | Amendola |
| 5,974,235 A | 10/1999 | Nunally et al. |
| 5,992,857 A | 11/1999 | Ueda et al. |
| 6,052,124 A | 4/2000 | Stein et al. |
| 6,054,234 A | 4/2000 | Weiss et al. |
| 6,093,501 A | 7/2000 | Werth |
| 6,127,058 A | 10/2000 | Pratt et al. |
| 6,179,986 B1 | 1/2001 | Swette et al. |
| 6,250,078 B1 | 6/2001 | Amendola et al. |
| 6,265,093 B1 | 7/2001 | Surampudi et al. |
| 6,268,076 B1 | 7/2001 | Diekmann et al. |
| 6,280,869 B1 | 8/2001 | Chen |
| 6,303,244 B1 | 10/2001 | Surampudi et al. |
| 6,307,605 B1 | 10/2001 | Bailey |
| 6,326,097 B1 | 12/2001 | Hockaday |
| 6,406,808 B1 | 6/2002 | Pratt et al. |
| 6,413,665 B1 | 7/2002 | Blanchet et al. |
| 6,428,680 B1 | 8/2002 | Kriechauf |
| 6,432,566 B1 | 8/2002 | Condit et al. |
| 6,433,129 B1 | 8/2002 | Amendola et al. |
| 6,434,278 B1 | 8/2002 | Hashimoto |
| 6,468,694 B1 | 10/2002 | Amendola |
| 6,471,850 B2 | 10/2002 | Shiepe et al. |
| 6,483,275 B1 | 11/2002 | Nebrigic et al. |
| 6,497,973 B1 | 12/2002 | Amendola |
| 6,506,510 B1 | 1/2003 | Sioui et al. |
| 6,506,511 B1 * | 1/2003 | Lakeman et al. ............. 429/421 |
| 6,508,195 B1 | 1/2003 | Tipaldo |
| 6,524,450 B1 | 2/2003 | Hara |
| 6,524,542 B2 | 2/2003 | Amendola et al. |
| 6,534,033 B1 | 3/2003 | Amendola et al. |
| 6,535,658 B1 | 3/2003 | Mendoza et al. |
| 6,541,149 B1 | 4/2003 | Maynard et al. |
| 6,544,679 B1 | 4/2003 | Petillo et al. |
| 6,586,563 B1 | 7/2003 | Ortega et al. |
| 6,596,236 B2 | 7/2003 | DiMeo, Jr. et al. |
| 6,610,193 B2 | 8/2003 | Schmitman |
| 6,620,542 B2 | 9/2003 | Pan |
| 6,632,554 B2 | 10/2003 | Doshi et al. |
| 6,638,654 B2 | 10/2003 | Jankowksi et al. |
| 6,645,651 B2 | 11/2003 | Hockaday et al. |
| 6,670,444 B2 | 12/2003 | Amendola et al. |
| 6,672,078 B2 | 1/2004 | Ovshinsky et al. |
| 6,683,025 B2 | 1/2004 | Amendola et al. |
| 6,706,909 B1 | 3/2004 | Snover et al. |
| 6,727,012 B2 | 4/2004 | Chen et al. |
| 6,728,422 B1 | 4/2004 | Weiss |
| 6,760,488 B1 | 7/2004 | Moura et al. |
| 6,801,136 B1 | 10/2004 | Goodman et al. |
| 6,804,949 B2 | 10/2004 | Andrews et al. |
| 6,833,207 B2 | 12/2004 | Joos et al. |
| 6,852,436 B2 | 2/2005 | Badding et al. |
| 6,866,806 B2 | 3/2005 | Andrews et al. |
| 6,932,847 B2 | 8/2005 | Amendola et al. |
| 6,939,529 B2 | 9/2005 | Strizki et al. |
| 6,942,941 B2 | 9/2005 | Blunk et al. |
| 6,950,030 B2 | 9/2005 | Kovarik et al. |
| 6,953,009 B2 | 10/2005 | Reinke et al. |
| 6,977,123 B1 | 12/2005 | Burroughs et al. |
| 7,001,681 B2 | 2/2006 | Wood |
| 7,019,105 B2 | 3/2006 | Amendola et al. |
| 7,049,024 B2 | 5/2006 | Leban |
| 7,073,368 B2 | 7/2006 | Wood et al. |
| 7,083,657 B2 | 8/2006 | Mohring et al. |
| 7,105,033 B2 | 9/2006 | Strizki et al. |
| 7,108,777 B2 | 9/2006 | Xu et al. |
| 7,128,997 B2 | 10/2006 | Harding et al. |
| 7,322,205 B2 | 1/2008 | Bourne et al. |
| 7,367,334 B2 | 5/2008 | Faison, Jr. et al. |
| 7,524,342 B2 | 4/2009 | Brinkley, III |
| 7,527,885 B2 | 5/2009 | Toukura |
| 7,691,527 B2 | 4/2010 | Petillo et al. |
| 7,807,131 B2 | 10/2010 | Eickhoff |
| 8,557,479 B2 | 10/2013 | Eickhoff et al. |
| 2001/0012494 A1 | 8/2001 | Kreichauf |
| 2001/0028973 A1 | 10/2001 | Ong et al. |
| 2002/0068213 A1 | 6/2002 | Kaiser et al. |
| 2002/0114983 A1 | 8/2002 | Frank et al. |
| 2002/0154310 A1 | 10/2002 | DiMeo, Jr. et al. |
| 2002/0177031 A1 | 11/2002 | Doshi et al. |
| 2003/0009942 A1 | 1/2003 | Amendola et al. |
| 2003/0044656 A1 | 3/2003 | Wood |
| 2003/0054215 A1 | 3/2003 | Doshi et al. |
| 2003/0157018 A1 | 8/2003 | Zaluski et al. |
| 2003/0235728 A1 | 12/2003 | Van Zee et al. |
| 2004/0009379 A1 | 1/2004 | Amendola et al. |
| 2004/0011662 A1 | 1/2004 | Xu et al. |
| 2004/0033194 A1 | 2/2004 | Amendola et al. |
| 2004/0035054 A1 | 2/2004 | Mohring et al. |
| 2004/0047801 A1 | 3/2004 | Petillo et al. |
| 2004/0053100 A1 | 3/2004 | Stanley et al. |
| 2004/0101740 A1 | 5/2004 | Sanders |
| 2004/0120889 A1 | 6/2004 | Shah et al. |
| 2004/0148857 A1 | 8/2004 | Strizki et al. |
| 2004/0161646 A1 | 8/2004 | Rezachek et al. |
| 2004/0191152 A1 | 9/2004 | Amendola et al. |
| 2004/0209133 A1 | 10/2004 | Hirsch et al. |
| 2004/0215407 A1 | 10/2004 | Thielman et al. |
| 2005/0022883 A1 | 2/2005 | Adams et al. |
| 2005/0079128 A1 | 4/2005 | deVos et al. |
| 2005/0118469 A1 | 6/2005 | Leach et al. |
| 2005/0132640 A1 | 6/2005 | Kelly et al. |
| 2005/0135996 A1 | 6/2005 | Ortega et al. |
| 2005/0136300 A1 | 6/2005 | Dyer |
| 2005/0142410 A1 | 6/2005 | Higashi et al. |
| 2005/0158595 A1 | 7/2005 | Marsh et al. |

(56) References Cited

U.S. PATENT DOCUMENTS

| | | |
|---|---|---|
| 2005/0166812 A1 | 8/2005 | Noll et al. |
| 2005/0181245 A1 | 8/2005 | Bonne et al. |
| 2005/0199546 A1 | 9/2005 | Rusta-Sallehy et al. |
| 2005/0238573 A1 | 10/2005 | Zhang et al. |
| 2005/0249993 A1 | 11/2005 | Horiuchi et al. |
| 2005/0260461 A1 | 11/2005 | Wood et al. |
| 2005/0262924 A1 | 12/2005 | Wood et al. |
| 2005/0268555 A1 | 12/2005 | Amendola et al. |
| 2005/0276746 A1 | 12/2005 | Zhang et al. |
| 2006/0014059 A1 | 1/2006 | Wood |
| 2006/0021279 A1 | 2/2006 | Mohring et al. |
| 2006/0040152 A1 | 2/2006 | Wood |
| 2006/0045228 A1 | 3/2006 | Shiao et al. |
| 2006/0102489 A1 | 5/2006 | Kelly |
| 2006/0102491 A1 | 5/2006 | Kelly et al. |
| 2006/0127722 A1 | 6/2006 | Nakajima et al. |
| 2006/0144701 A1 | 7/2006 | Kelly |
| 2006/0174952 A1 | 8/2006 | Curello et al. |
| 2006/0210850 A1 | 9/2006 | Abouatallah et al. |
| 2006/0261349 A1 | 11/2006 | Doering et al. |
| 2007/0026282 A1 | 2/2007 | Kumagai et al. |
| 2007/0104996 A1* | 5/2007 | Eickhoff et al. ............ 429/34 |
| 2007/0105008 A1 | 5/2007 | Gu et al. |
| 2007/0141440 A1 | 6/2007 | Yang et al. |
| 2007/0190400 A1* | 8/2007 | Buche et al. ............ 429/44 |
| 2007/0217994 A1 | 9/2007 | Amendola et al. |
| 2007/0259227 A1 | 11/2007 | Oishi et al. |
| 2007/0269698 A1 | 11/2007 | Gu |
| 2007/0271844 A1 | 11/2007 | Mohring et al. |
| 2007/0275291 A1 | 11/2007 | Gu et al. |
| 2007/0277870 A1 | 12/2007 | Wechsler |
| 2007/0287059 A1 | 12/2007 | Eickhoff et al. |
| 2008/0003484 A1* | 1/2008 | Chen et al. ............ 429/38 |
| 2008/0057378 A1 | 3/2008 | Kang et al. |
| 2008/0090129 A1* | 4/2008 | Kunz et al. ............ 429/34 |
| 2008/0107930 A1 | 5/2008 | Eickhoff et al. |
| 2008/0124609 A1 | 5/2008 | Sasahara et al. |
| 2008/0160383 A1* | 7/2008 | Shen et al. ............ 429/34 |
| 2008/0199740 A1 | 8/2008 | Giddey et al. |
| 2008/0220300 A1 | 9/2008 | Jones et al. |
| 2008/0233462 A1 | 9/2008 | Curello et al. |
| 2008/0241635 A1* | 10/2008 | Sato et al. ............ 429/34 |
| 2008/0268299 A1 | 10/2008 | Eickhoff et al. |
| 2008/0274393 A1 | 11/2008 | Markoski et al. |
| 2008/0280169 A1* | 11/2008 | Niu et al. ............ 429/13 |
| 2008/0280183 A1 | 11/2008 | Eun et al. |
| 2009/0113795 A1 | 5/2009 | Eickhoff |
| 2010/0151283 A1 | 6/2010 | Eickhoff |
| 2011/0003237 A1 | 1/2011 | Eickhoff et al. |

FOREIGN PATENT DOCUMENTS

| | | |
|---|---|---|
| EP | 1372205 A2 | 12/2003 |
| EP | 1496561 | 1/2005 |
| EP | 1372205 A3 | 7/2005 |
| EP | 1845572 A1 | 10/2007 |
| EP | 1372205 | 10/2008 |
| EP | 2055669 A2 | 5/2009 |
| EP | 2055669 | 6/2009 |
| EP | 2056382 | 6/2009 |
| GB | 723180 | 2/1955 |
| GB | 2164446 | 3/1986 |
| JP | 57138782 | 8/1982 |
| JP | 60000066 | 1/1985 |
| JP | 4342439 | 11/1992 |
| JP | 666787 | 3/1994 |
| JP | 9326259 | 12/1997 |
| WO | 0035032 | 6/2000 |
| WO | 0045457 | 8/2000 |
| WO | 0185606 | 11/2001 |
| WO | 03084866 | 10/2003 |
| WO | 2004025750 | 3/2004 |
| WO | 2004035464 | 4/2004 |
| WO | 2004075375 | 9/2004 |
| WO | WO-2005/004273 A2 | 1/2005 |
| WO | 2005013403 | 2/2005 |
| WO | WO-2006/113469 A1 | 10/2006 |
| WO | WO-2007/134095 A2 | 11/2007 |

OTHER PUBLICATIONS

Amendola et al., "A Novel High Power Density Borohydride-Air Cell," Electromechanical Society Proceedings, vol. 98-15, pp. 47-54, Nov. 1, 1998.

Amendola et al., "A Safe Portable Hydrogen Gas Generator Using Aqueous Borohyfride Solution and Ru Catalyst," International Journal of Hydrogen Energy, Vo., 25, No. 10, pp. 969-975, 2000.

Amendola et al., An Ultrasafe Hydrogen Generator: Aqueous, Alkaline Borohydride Solutions and Ru Calalyst, Journal of Power Sources, vol. 85, No. 2, pp. 186-189, 2000.

http://www.engadget.com/2010/02/03/horizon-debuts-h-cell . . . , "Horizon Debuts H-Cell 2.0 Hydrogen Fuel Cell System for R/C Cars," 3 pages, printed Feb. 12, 2010.

Horizon Fuel Cell Technologies, "Hobby RC Industry Leaps into the Future with Hydrogen Power," 2 pages, Feb. 3, 2010.

"U.S. Appl. No. 11/592,692, Non Final Office Action mailed Jan. 21, 2011", 8 pgs.

"U.S. Appl. No. 11/592,692, Non Final Office Action mailed Jul. 19, 2011", 12 pgs.

"U.S. Appl. No. 11/592,692, Non-Final Office Action mailed Jul. 23, 2010", 9 pgs.

"U.S. Appl. No. 11/592,692, Notice of Allowance mailed May 31, 2012", 6 pgs.

"U.S. Appl. No. 11/592,692, Preliminary Amendment filed Nov. 3, 2006", 3 pgs.

"U.S. Appl. No. 11/592,692, Response filed Apr. 18, 2011 to Non Final Office Action mailed Jan. 21, 2011", 8 pgs.

"U.S. Appl. No. 11/592,692, Response filed Apr. 28, 2010 to Restriction Requirement mailed Mar. 31, 2010", 7 pgs.

"U.S. Appl. No. 11/592,692, Response filed Oct. 19, 2011 to Non Final Office Action mailed Jul. 19, 2011", 8 pgs.

"U.S. Appl. No. 11/592,692, Response filed Oct. 25, 2010 to Non Final Office Action mailed Jul. 23, 2010", 9 pgs.

"U.S. Appl. No. 11/592,692, Response to Rule 312 Amendment mailed Sep. 5, 2012", 2 pgs.

"U.S. Appl. No. 11/592,692, Restriction Requirement mailed Mar. 31, 2010", 6 pgs.

"U.S. Appl. No. 11/606,758, Examiner Interview Summary mailed Mar. 25, 2010", 2 pgs.

"U.S. Appl. No. 11/606,758, Final Office Action mailed Jun. 10, 2009", 10 pgs.

"U.S. Appl. No. 11/606,758, Final Office Action mailed Jun. 24, 2011", 10 pgs.

"U.S. Appl. No. 11/606,758, Final Office Action mailed Sep. 15, 2010", 9 pgs.

"U.S. Appl. No. 11/606,758, Non-Final Office Action mailed Mar. 25, 2010", 11 pgs.

"U.S. Appl. No. 11/606,758, Non-Final Office Action mailed May 12, 2008", 13 pgs.

"U.S. Appl. No. 11/606,758, Non-Final Office Action mailed Nov. 13, 2009", 11 pgs.

"U.S. Appl. No. 11/606,758, Non-Final Office Action mailed Nov. 24, 2008", 10 pgs.

"U.S. Appl. No. 11/606,758, Response filed Jan. 4, 2010 to Non Final Office Action mailed Nov. 13, 2009", 12 pgs.

"U.S. Appl. No. 11/606,758, Response filed Feb. 7, 2008 to Restriction Requirement mailed Jan. 7, 2008", 6 pgs.

"U.S. Appl. No. 11/606,758, Response filed Feb. 24, 2009 to Non Final Office Action mailed Nov. 24, 2008", 9 pgs.

"U.S. Appl. No. 11/606,758, Response filed Jun. 21, 2010 to Non Final Office Action mailed Mar. 25, 2010", 12 pgs.

"U.S. Appl. No. 11/606,758, Response filed Aug. 12, 2008 to Non-Final Office Action mailed May 12, 2008", 11 pgs.

"U.S. Appl. No. 11/606,758, Response filed Aug. 17, 2011 to Final Office Action mailed Jun. 24, 2011", 14 pgs.

"U.S. Appl. No. 11/606,758, Response filed Sep. 10, 2009 to Final Office Action mailed Jun. 10, 2009", 12 pgs.

(56) References Cited

OTHER PUBLICATIONS

"U.S. Appl. No. 11/606,758, Response filed Nov. 10, 2010 to Final Office Action mailed Sep. 15, 2010", 13 pgs.
"U.S. Appl. No. 11/606,759, Restriction Requirement mailed Jan. 7, 2008", 6 pgs.
"U.S. Appl. No. 12/335,352, Advisory Action mailed Jun. 6, 2012", 3 pgs.
"U.S. Appl. No. 12/335,352, Final Office Action mailed Apr. 27, 2012", 12 pgs.
"U.S. Appl. No. 12/335,352, Non Final Office Action mailed Dec. 23, 2011", 9 pgs.
"U.S. Appl. No. 12/335,352, Preliminary Amendment filed Dec. 15, 2008", 3 pgs.
"U.S. Appl. No. 12/335,352, Response filed Jan. 27, 2012 to Non Final Office Action mailed Dec. 23, 2011", 12 pgs.
"U.S. Appl. No. 12/335,352, Response filed May 16, 2012 to Final Office Action mailed Apr. 27, 2012", 14 pgs.
"U.S. Appl. No. 12/335,352, Response filed Nov. 8, 2011 to Restriction Requirement mailed Oct. 12, 2011", 6 pgs.
"U.S. Appl. No. 12/335,352, Restriction Requirement mailed Oct. 12, 2011", 5 pgs.
"U.S. Appl. No. 12/705,423, Amendment and Response filed Aug. 1, 2012 to Restriction mailed Jul. 16, 2012", 5 pgs.
"U.S. Appl. No. 12/705,423, Non Final Office Action mailed Sep. 6, 2012", 6 pgs.
"U.S. Appl. No. 12/705,423, Preliminary Amendment filed Feb. 10, 2011", 6 pgs.
"U.S. Appl. No. 12/705,423, Response filed Oct. 16, 2012 to Non Final Office Action mailed Sep. 6, 2012", 8 pgs.
"U.S. Appl. No. 12/705,423, Restriction Requirement mailed Jul. 16, 2012", 5 pgs.
"U.S. Appl. No. 12/829,082 , Response filed Oct. 31, 2012 to Non Final Office Action mailed Sep. 24, 2012", 11 pgs.
"U.S. Appl. No. 12/829,082, Final Office Action mailed Dec. 20, 2012", 9 pgs.
"U.S. Appl. No. 12/829,082, Non Final Office Action mailed Sep. 24, 2012", 9 pgs.
"U.S. Appl. No. 12/829,082, Preliminary Amendment filed Jul. 1, 2010", 5 pgs.
"European Application Serial No. 07854813.8, Office Action mailed Feb. 9, 2011", 5 pgs.
"European Application Serial No. 07854313.8, Office Action mailed Dec. 21, 2011", 4 pgs.
"European Application Serial No. 07854813.8, Response filed Apr. 13, 2012 to Office Action mailed Dec. 21, 2012", 6 pgs.
"European Application Serial No. 07854313.8, Response filed Jun. 9, 2011 to Office Action mailed Feb. 9, 2011", 7 pgs.
"European Application Serial No. 11153723.9, European Search Report mailed Mar. 22, 2011", 2 pgs.
"European Application Serial No. 11153723.9, Office Action mailed May 20, 2011", 5 pgs.
"European Application Serial No. 11153723.9, Response filed Sep. 21, 2011 to Office Action mailed May 20, 2011", 2 pgs.
"European Application Serial No. 11154088.6, European Search Report mailed May 23, 2011", 3 pgs.
"European Application Serial No. 11154038.6, Office Action mailed May 30, 2011", 5 pgs.
"European Application Serial No. 11154088.6, Office Action mailed Aug. 22, 2011", 2 pgs.
"European Application Serial No. 11154088.6, Response filed Sep. 12, 2011 to Office Action mailed May 30, 2010", 12 pgs.
"International Application Serial No. PCT/US2007/085766, International Preliminary Report on Patentability dated Jun. 3, 2009", 6 pgs.
"International Application U.S. Appl. No. PCT/US2007/085766, International Search Report mailed Apr. 2, 2008", 4 pgs.
"International Application Serial No. PCT/US2007/085766, Written Opinion mailed Apr. 2, 2008", 6 pgs.
Diaz, H., et al., "Thermodynamic and Structural properties of LaNi5-yAly compounds and their related hydrides", *International Journal of Hydrogen Energy*, 4, (1979), 445-454.
Mendelsohn, M. H., et al., "The Effect of Aluminum Additions on the Structural and Hydrogen Absorption properties of ABS Alloys with Particular reference to the LaNi5-xAlx Ternary Alloy System", *Journal of the Less-Common Metals*, 63, (1979), 193-207.
Pasaogullari, Ugur, "Liquid Water Transport in Polymer Electrolyte Fuel Cells with Multi-Layer Diffusion Media", *Proceedings of IMECE04, 2004 ASME International Mechanical Engineering Congress and Exposition*, Anaheim, California, (2004), 1-9.
"U.S. Appl. No. 12/705,423 , Response filed Apr. 19, 2013 to Final Office Action mailed Feb. 19, 2013", 10 pgs.
"U.S. Appl. No. 12/705,423, Advisory Action mailed May 10, 2013", 3 pgs.
"U.S. Appl. No. 12/705,423, Final Office Action mailed Feb. 19, 2013", 7 pgs.
"U.S. Appl. No. 12/705,423, Response filed May 20, 2013 to Non Final Office Action mailed Feb. 19, 2013", 10 pgs.
"U.S. Appl. No. 12/829,082, Advisory Action mailed Mar. 4, 2013", 3 pgs.
"U.S. Appl. No. 12/829,082, Notice of Allowance mailed May 20, 2013", 9 pgs.
"U.S. Appl. No. 12/829,082, Response filed Feb. 20, 2013 to Final Office Action mailed Dec. 20, 2012", 10 pgs.
"U.S. Appl. No. 12/705,423, Final Office Action mailed Nov. 8, 2013", 8 pgs.
"U.S. Appl. No. 12/705423, Response filed Oct. 8, 2013 to Non Final Office Action mailed Jul. 8, 2013", 11 pgs.
"U.S. Appl. No. 12/705,423, Non Final Office Action mailed Jul. 8, 2013", 8 pgs.
"U.S. Appl. No. 12/335,352, Notice of Allowance mailed Mar. 14, 2014", 8 pgs.
"U.S. Appl. No. 12/705,423, Response filed Feb. 6, 2014 to Final Office Action mailed Nov. 8, 2013", 14 pgs.
"U.S. Appl. No. 12/705,423,Supplemental Response filed Feb. 10, 2014 to Final Office Action mailed Nov. 8, 2013", 16 pages.
"European Application Serial No. 11154088.6, Examination Notification Art. 94(3) mailed Mar. 13, 2014", 4 pgs.

\* cited by examiner

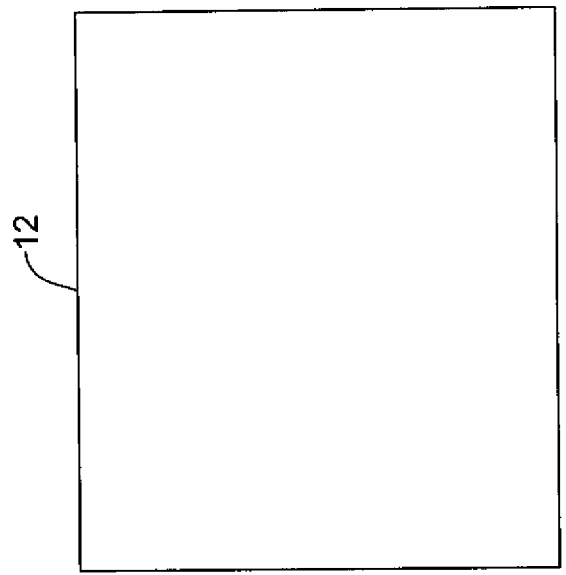
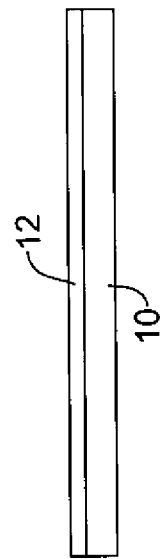
Figure 2

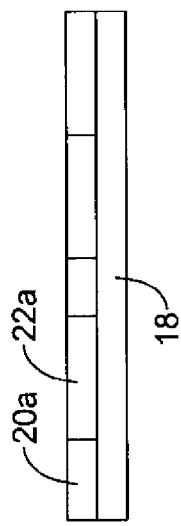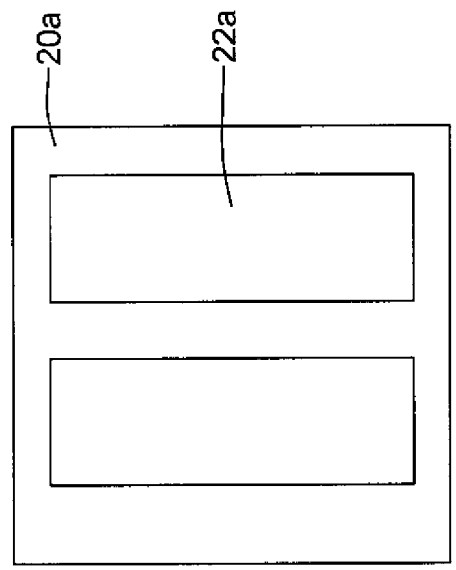
Figure 6

FUEL CELL

PRIORITY

This application is a continuation-in-part of U.S. patent application Ser. No. 12/335,352 entitled "Metal Hydride Fuel Cell Power Generator", the entire disclosure of which is herein incorporated by reference.

TECHNICAL FIELD

The present disclosure relates generally to fuel cells, and more particularly, to fuel cells and/or components thereof, as well as methods of making fuel cells.

BACKGROUND

A wide variety of fuel cells have been developed. Of the known fuel cells, each has certain advantages and disadvantages. There is an ongoing need to provide alternative fuel cells.

SUMMARY

The disclosure relates generally to fuel cells, and more particularly, to fuel cells and/or components thereof, as well as methods of making fuel cells. An example fuel cell assembly may include a proton exchange membrane (or membrane electrode assembly) that has a first major surface and a second major surface. An anode electrode, which may include a patterned metal layer with a plurality of apertures extending through the patterned metal layer, may also be provided. An anode gas diffusion layer secured to an anode adhesive frame may be situated between the anode electrode and the first major surface of the proton exchange membrane. A cathode electrode may, in some instances, include a patterned metal layer with a plurality of apertures extending through the patterned metal layer. A cathode gas diffusion layer secured to a cathode adhesive frame may be situated between the cathode electrode and the second major surface of the proton exchange membrane. In some instances, the anode gas diffusion layer and the anode adhesive frame lie substantially in a common plane, but this is not required. Likewise, the cathode gas diffusion layer and the cathode adhesive frame may lie substantially in a common plane, but again this is not required.

In some instances, the resulting fuel cell assembly may be flexible so that the fuel cell assembly can be rolled into a rolled configuration that defines an inner cavity with open ends. In some cases, the rolled configuration may be a substantially cylindrical configuration. A fuel pellet may be inserted into the inner cavity, and one or more end caps may be provided to cover and seal the open ends.

The above summary is not intended to describe each disclosed embodiment or every implementation of the present disclosure. The Figures and Description which follow more particularly exemplify various illustrative embodiments.

BRIEF DESCRIPTION OF THE DRAWINGS

The invention may be more completely understood in consideration of the following description of various illustrative embodiments in connection with the accompanying drawings, in which:

FIG. 2 is a top and side view of an example insulting film on the substrate;

FIG. 6 is an example layer disposed on the electrode;

Figure 1:
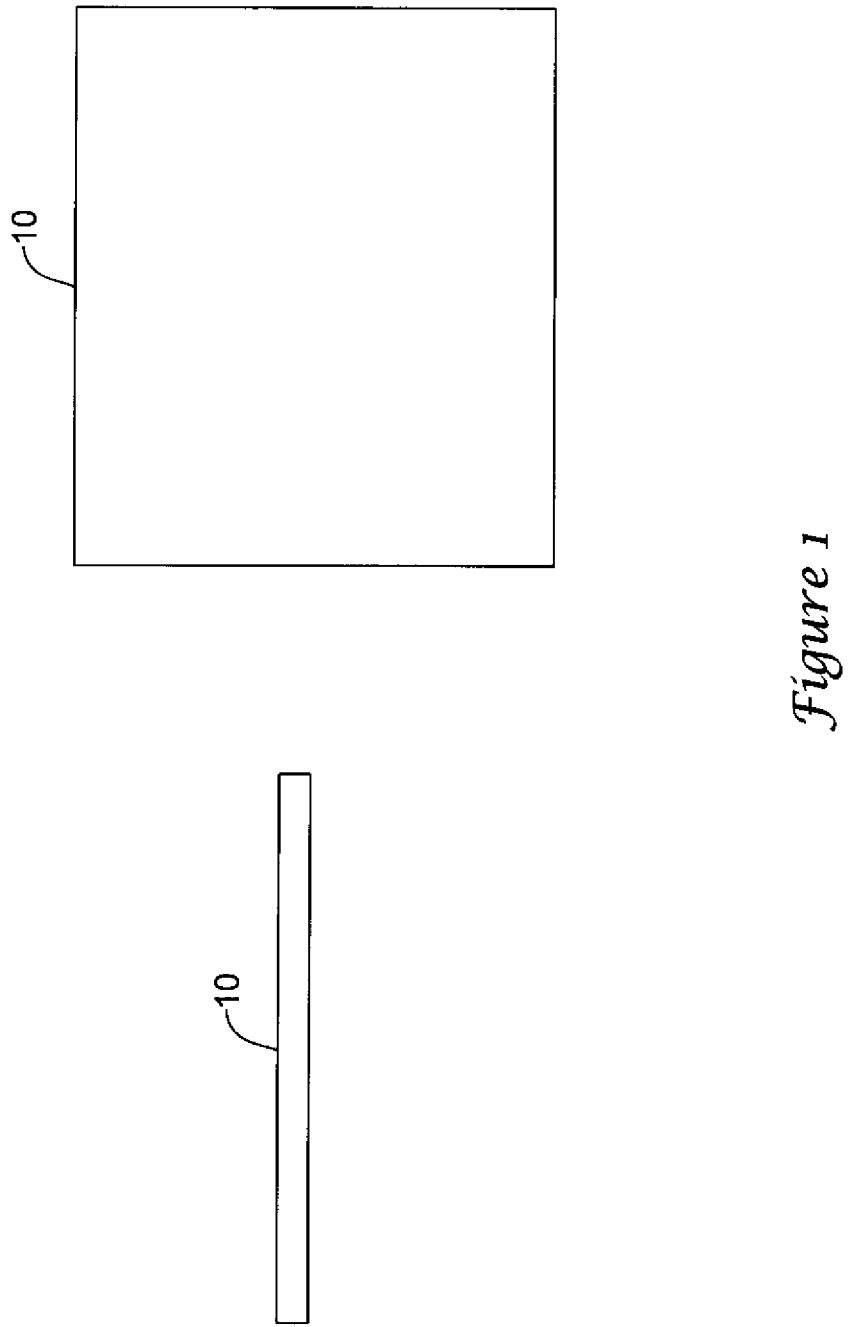
FIG. 1 is a top and side view of an example substrate for use in forming an illustrative fuel cell electrode.

While this disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the invention.

DESCRIPTION

The following description should be read with reference to the drawings in which similar elements in different drawings are numbered the same. The drawings, which are not necessarily to scale, depict illustrative embodiments and are not intended to limit the scope of the invention.

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

Fuel cells may be desirable, for example, because they may represent a commercially viable power source that offers a relatively high energy density and a relatively high power density. The use of fuel cell stacks, which may include assembling or stacking a number of layers to form a fuel cell stack assembly, may be important for the manufacturing of such viable fuel cells. For example, some fuel cell stack assemblies may be relatively inexpensive, thin, and flexible. As such, these fuel cell stack assemblies may be capable of being used in a wide variety of fuel cells, in a wide variety of different shapes (e.g., non-planar form factors) and applications. A fuel cell stack assembly may, for example, be rolled or otherwise formed into a desired shape and configured for a variety of uses.

Manufacturing a fuel cell may include a number of processes and/or processing steps. For example, FIGS. 1-4 show a number of illustrative steps for forming a fuel cell electrode.

Figure 8:
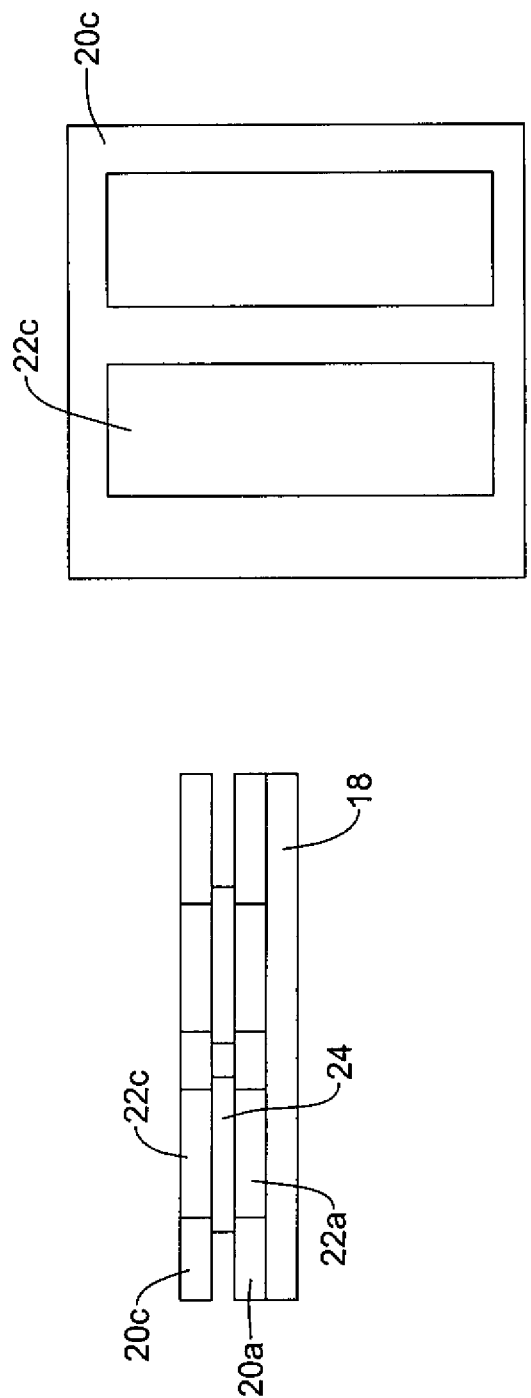
FIG. 8 is another example layer disposed on the structure illustrated in FIG. 7.
Figure 9:
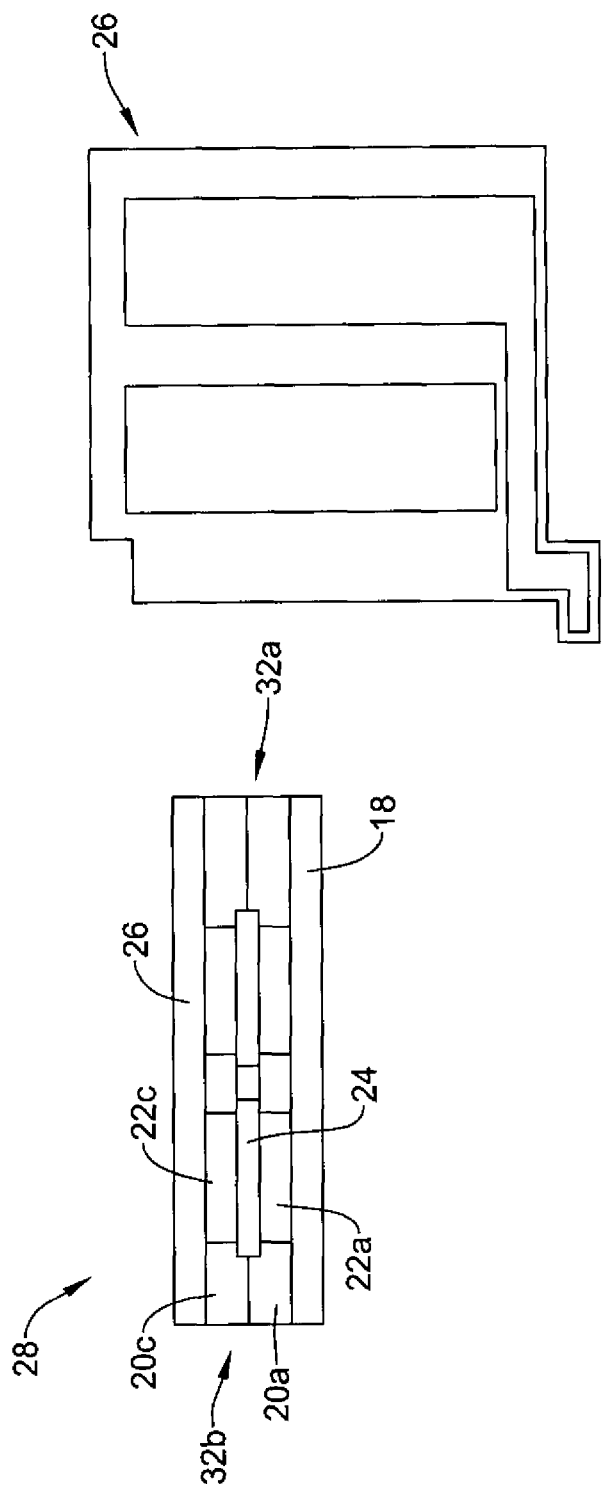
FIG. 9 is another example electrode disposed on the structure illustrated in FIG. 8.
Figure 10:
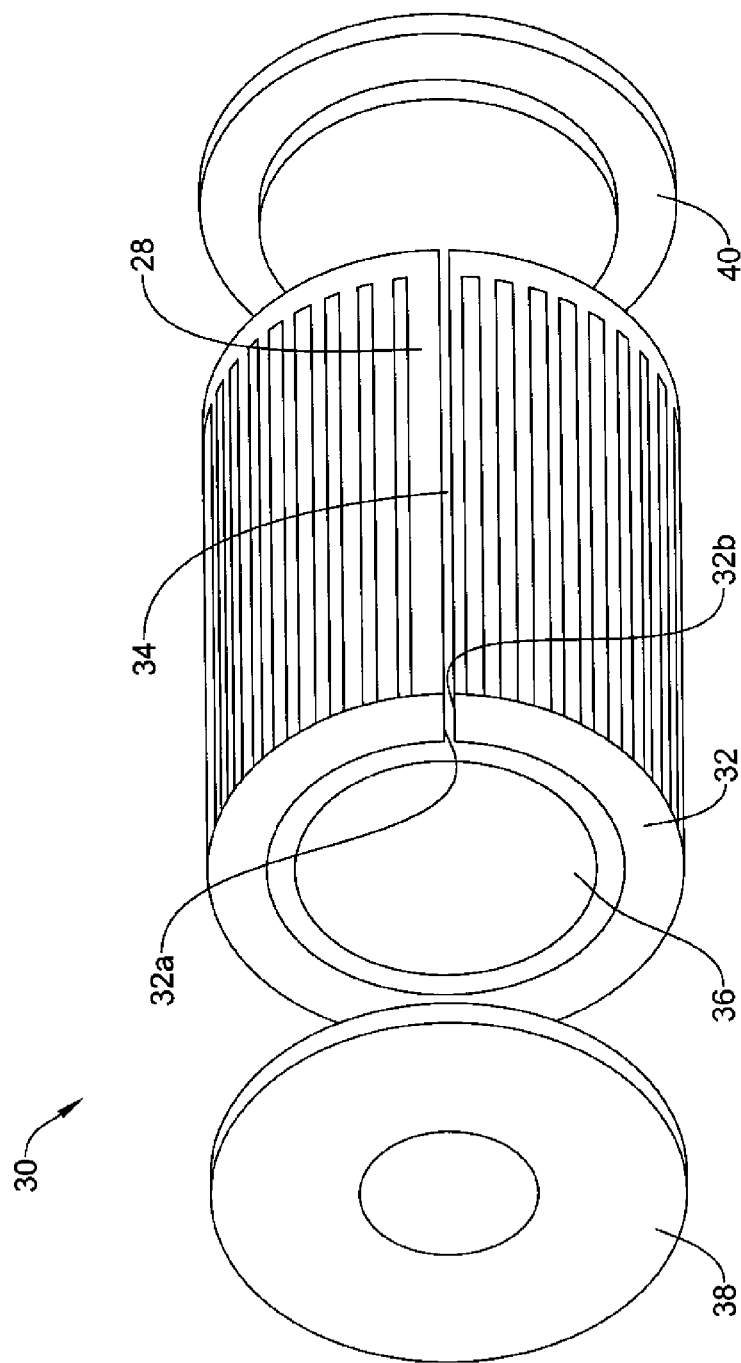
FIG. 10 is an exploded view of an example fuel cell.

FIGS. 5-9 show an illustrative method of making a relatively planar fuel cell stack assembly. FIG. 10 shows an illustrative fuel cell assembly that has been rolled into a rolled configuration to form an inner cavity that may include a fuel pellet.

As shown in FIGS. 1-4, fabrication of an illustrative fuel cell electrode may, in some cases, begin with a substrate 10 as illustrated in FIG. 1. Substrate 10 may include a metal substrate. For example, substrate 10 may include nickel plated steel, stainless steel, a corrosion resistant metal, or any other suitable material, as desired. The form of substrate 10 may vary. For example, substrate 10 may include a generally planar sheet of material. In one example embodiment, substrate 10 may be about 0.001 to about 0.010 inches thick or so. Other sizes, shapes and/or thicknesses are contemplated.

In the illustrative method, a layer of material 12 may be disposed on substrate 10, as illustrated in FIG. 2. In at least some embodiments, material 12 may be an insulting and/or dielectric material. For example, material 12 may be polyimide or any other suitable dielectric material. In one example embodiment, material 12 may be about 1-10 μm thick or so. Other thicknesses are contemplated.

Figure 3:
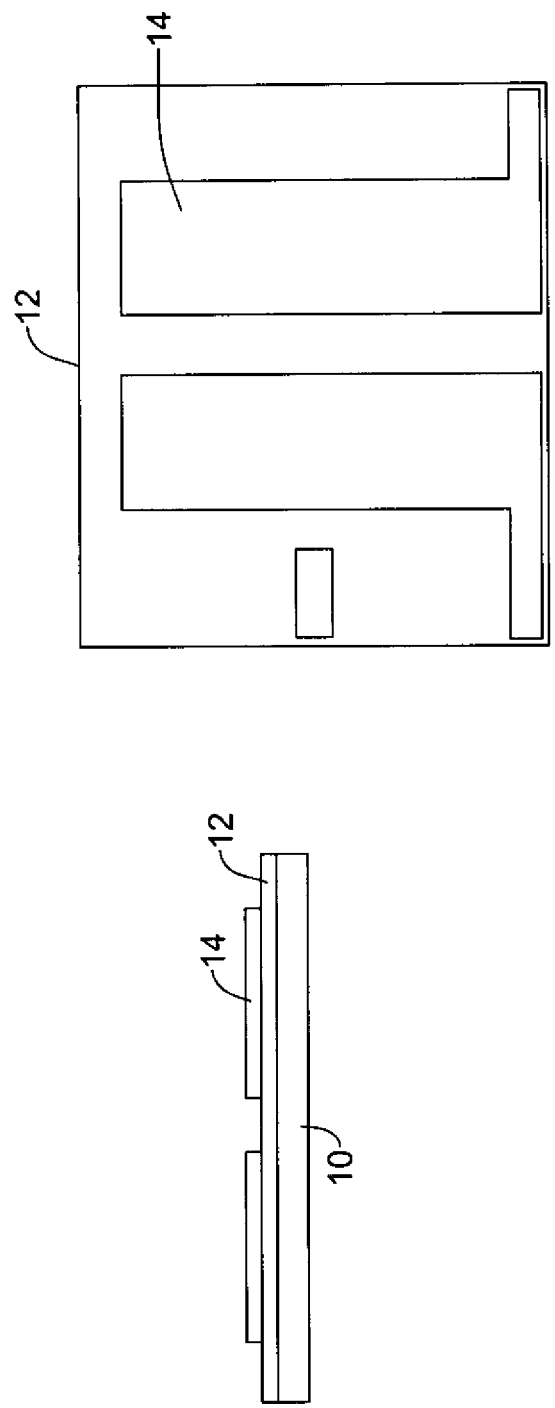
FIG. 3 is a top and side view of an example layer of metal on the insulating film.

Next, and as shown in FIG. 3, a layer of metal 14 may be disposed on material 12. Metal 14 may take the form of a gold layer that is, for example, patterned on the surface of material 12 with a shadow mask. It is contemplated that other materials and/or methods may be used to dispose metal 14 on material 12.

Figure 4:
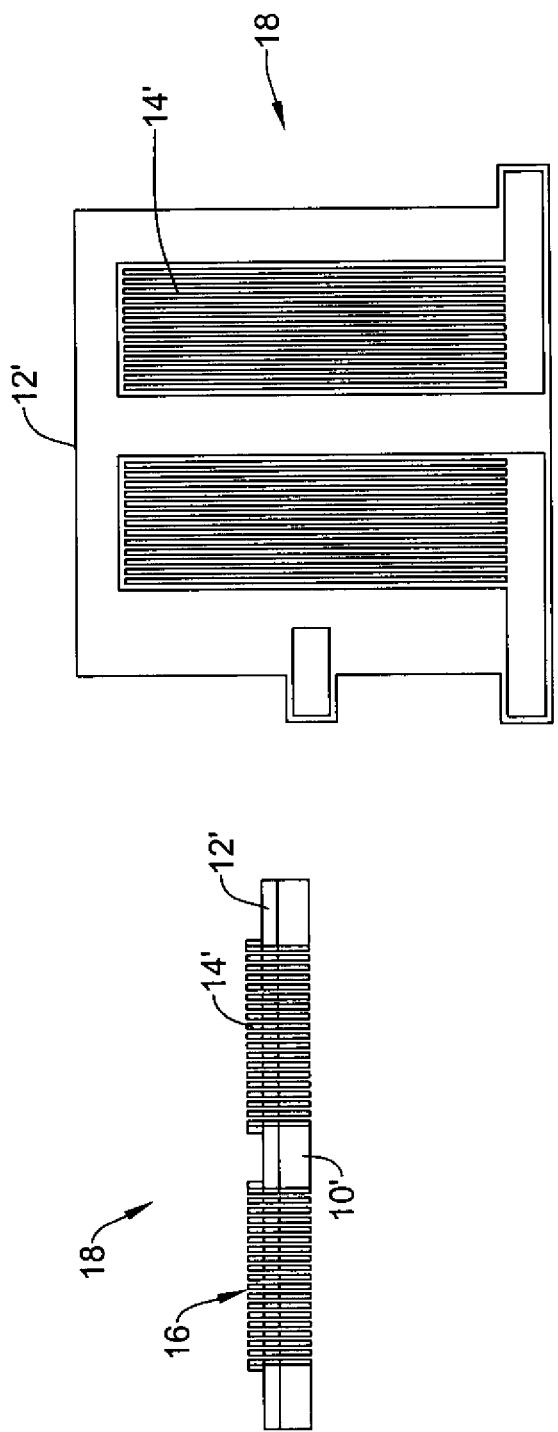
FIG. 4 is a top and side view illustrating perforations in the structure shown in FIG. 3.

Next, and as shown in FIG. 4, one or more of layers 10/12/14 may be perforated to create a plurality of apertures. The apertures may extend through layers 10, 12, and/or 14. Creating the apertures may include, for example, perforating layers 10, 12, and/or 14 with an appropriate cutting tool or die, using a cutting laser, using chemical etching, or using any other suitable method, as desired.

Perforations may form a perforated surface 16 that may include perforation of metal layer 14 (indicated in FIG. 4 with reference number 14'), perforation of material 12 (indicated in FIG. 4 with reference number 12'), perforation of substrate 10 (indicated in FIG. 4 with reference number 10'), or perforation of any combination of these structures. After perforation, the resultant structure may take the form of an electrode 18. Electrode 18 may also be trimmed or otherwise cut or altered, if desired, so as to have the desired shape or configuration. Such an electrode 18 may be used, for example, as a cathode or anode electrode for a fuel cell assembly, as desired.

The process of forming a fuel cell stack assembly may include "stacking" various layers including electrodes as well as appropriate layers and/or materials between the electrodes. FIGS. 5-9 show an illustrative method of making an illustrative relatively planar fuel cell stack assembly.

Figure 5:
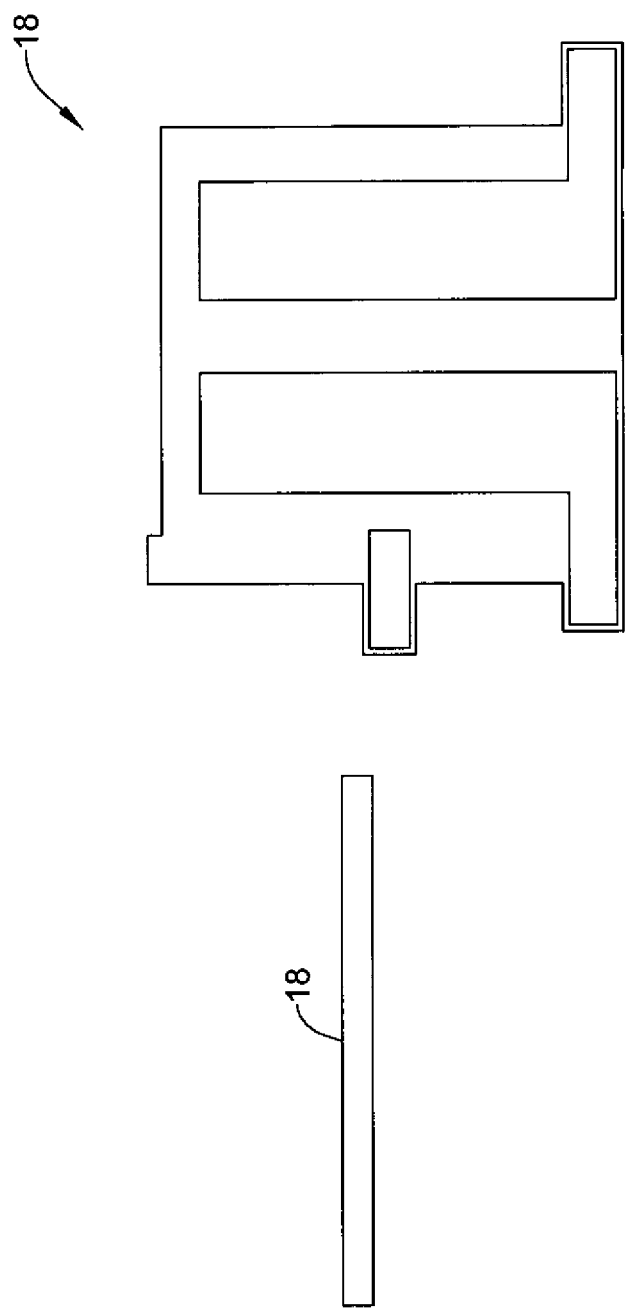
FIG. 5 is an example electrode.

As shown in FIG. 5, an electrode 18 may be provided. In this example, electrode 18 may comprise an anode. However, in other examples electrode 18 may be a cathode. One or more layers may be disposed on or adjacent to electrode 18. For example, in FIG. 6, a gas diffusion layer 22a and a layer of adhesive or adhesive frame 20a may be disposed on or adjacent to electrode 18. In at least some embodiments, layers 20a/22a may lie substantially in the same plane as shown. Layer 22a may be, for example, an anode gas diffusion layer. The material for gas diffusion layer 22a may depend on the application, and in some cases, may include a conductive material, a porous electrically conductive material, a carbon fabric, or the like. Other materials are also contemplated.

In the example illustrated in FIG. 6, adhesive frame 20a is generally disposed about the periphery and/or perimeter of gas diffusion layer 22a. This allows adhesive 20a to join with adhesive 20c (discussed below) and effect a gas seal therebetween as discussed below. This arrangement, however, is not intended to be limiting as other patterns, configuration, and/or arrangements are contemplated. Such arrangements may include any suitable method such as, for example, coating, screening, screen printing, combinations thereof, and the like, or any other suitable process.

Figure 7:
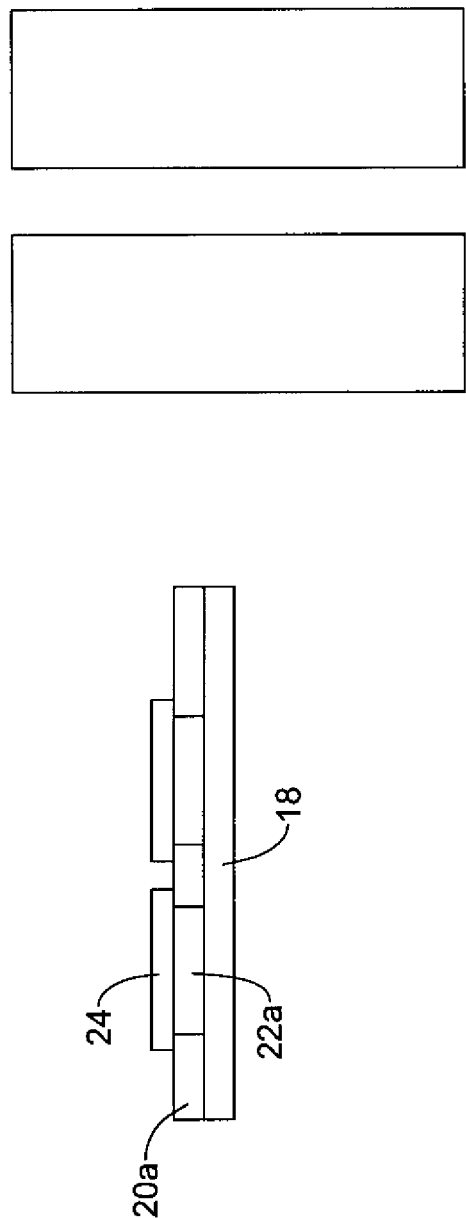
FIG. 7 is another example layer disposed on the structure illustrated in FIG. 6.

In some cases, a first major surface of a proton exchange membrane (PEM) (or membrane electrode assembly (MEA)) 24 may be disposed on or adjacent to layers 20a/22a, as shown in FIG. 7. The adhesive or adhesive frame 20a discussed above may help secure the electrode 18, the gas diffusion layer 22a and the membrane 24 together, and may further help form a gas seal therebetween. PEM 24 may include any suitable material such as, for example, a carbon and/or platinum coated ion-conductive material.

Another set of layers may be disposed on or adjacent a second major surface of the membrane 24. For example, FIG. 7 illustrates another gas diffusion layer 22c and a layer of adhesive or adhesive frame 20c disposed on or adjacent to the second major surface of the membrane 24. In at least some embodiments, layers 20c/22c may lie in the same plane. In some instances, layer 22c may be a cathode gas diffusion layer and/or may include a carbon fabric or other suitable material. Layers 20c/22c may be similar in form and function to layers 20a/22a described above.

Another electrode 26 may be disposed on layers 20c/22c as shown in FIG. 8. In this example, electrode 26 may comprise a cathode. However, in other examples electrode 26 may be an anode. Like above, the adhesive or adhesive frame 20c may help secure the electrode 26, the gas diffusion layer 22c and the membrane 24 together, and may further help form a gas seal therebetween. In some instances, the various layers may be compressed such that the layers adhere together and form a single monolithic fuel cell assembly 28. In FIG. 9, the joining together of adhesive layers 20a/20c is shown to represent the bonding together of the various layers and the forming of a gas seal along the periphery of the single monolithic fuel cell assembly 28.

FIG. 10 shows a fuel cell assembly 30, illustrated in exploded view. Here it can be seen that a fuel cell assembly 28 may be rolled together into a rolled configuration that defines an inner cavity. In the illustrative embodiment, the edges, for example a first edge 32a and a second edge 32b of the fuel cell assembly 28 may be joined together via welding, adhesive, or in any other suitable manner. The rolled configuration may form an inner cavity in which a fuel source or pellet 36 may be disposed within. Fuel cell assembly 30 may also include one or more caps such as a first end cap 38 and a second end cap 40 to cover the open ends of the cavity.

In at least some embodiments, fuel source 36 may include a hydrogen source. For example, fuel source 36 may include a metal hydride. Such materials may be desirable, for example, because it may be possible to recharge these materials with hydrogen. Example metal hydrides may include $LaNi_5H_5$, $FeTiH_2$, $Mg_2NiH_4$, and $TiV_2H_4$. Example chemical hydrides include but are not limited to $NaAlH_4$, $LiAlH_4$, $Mg(AlH_4)_2$, $Ti(AlH_4)_4$, $Fe(BH_4)_4$, $NaBH_4$, and $Ca(BH_4)_2$. Other materials are also contemplated.

The resultant fuel cell assembly 30 may form a power source that may used to power a variety of electronic devices. In some instances, fuel cell assembly 30 may have a form factor that allows it to be manufactured as a suitable replacement for typical AA, AAA, C, D, 9-volt, or other batteries currently used. In addition, because fuel cell assembly 30 may utilize a metal hydride for fuel source 36, it may be rechargeable such that it can be recharged a relatively large number of times so that the total cost of the fuel cell assembly may be relatively low to the end user.

It should be understood that this disclosure is, in many respects, only illustrative. Changes may be made in details, particularly in matters of shape, size, and arrangement of steps without exceeding the scope of the invention. The invention's scope is, of course, defined in the language in which the appended claims are expressed

What is claimed is:

1. A fuel cell assembly, comprising:
   a proton exchange membrane having a first major surface and a second major surface;
   an anode electrode, the anode electrode including a patterned metal layer with a plurality of apertures extending through the patterned metal layer;
   an anode adhesive frame including at least two vacant regions;
   an anode gas diffusion layer disposed within each anode adhesive frame vacant region, wherein:
      each anode gas diffusion layer with the anode adhesive frame is situated between the anode electrode and the first major surface of the proton exchange membrane;
      the anode adhesive frame forms a gas seal around each anode gas diffusion layer and between the anode electrode and the first major surface of the proton exchange membrane; and
      each anode gas diffusion layer and the anode adhesive frame lie substantially in a common plane;
   a cathode electrode, the cathode electrode including a patterned metal layer with a plurality of apertures extending through the patterned metal layer; and
   a cathode adhesive frame including at least two vacant regions; and
   a cathode gas diffusion layer disposed within each cathode adhesive frame vacant region, wherein:
      each cathode gas diffusion layer with the cathode adhesive frame is situated between the cathode electrode and the second major surface of the proton exchange membrane;
      the cathode adhesive frame forms a gas seal around each anode gas diffusion layer and between the cathode electrode and the second major surface of the proton exchange membrane;
      each cathode gas diffusion layer and the cathode adhesive frame lie substantially in a common plane; and
      the cathode adhesive frame adheres to the anode adhesive frame to form a gas seal disposed about each anode gas diffusion layer, the proton exchange membrane, and the cathode gas diffusion layer.

2. The fuel cell assembly of claim 1, wherein:
   the fuel cell assembly is arranged in a rolled configuration to define an inner cavity; and
   a fuel pellet disposed in the cavity.

3. The fuel cell assembly of claim 2, wherein the fuel cell assembly includes opposing edges, wherein when the fuel cell assembly is arranged in the rolled configuration, the two opposing edges of the fuel cell assembly are secured together to define the inner cavity.

4. The fuel cell assembly of claim 3, further comprising end caps for covering each of the two open ends of the fuel cell assembly when the fuel cell assembly is arranged in the rolled configuration.

5. The fuel cell assembly of claim 1, wherein the anode electrode includes a substrate, a dielectric layer on the substrate, and a patterned metal layer on the dielectric layer, wherein the plurality of apertures of the anode electrode extend through the patterned metal layer, the dielectric layer and the substrate.

6. The fuel cell assembly of claim 5, wherein the substrate is a metal foil.

7. The fuel cell assembly of claim 5, wherein the substrate extends beyond the pattern metal layer in at least one region of the anode electrode.

8. The fuel cell assembly of claim 5, wherein the cathode electrode includes a substrate, a dielectric layer on the substrate, and a patterned metal layer on the dielectric layer, wherein the plurality of apertures of the cathode electrode extend through the patterned metal layer, the dielectric layer and the substrate.

9. A fuel cell assembly, comprising:
   a proton exchange membrane having a first major surface and a second major surface;
   an anode electrode, the anode electrode including a patterned metal layer with a plurality of apertures extending through the patterned metal layer;
   an anode adhesive frame including at least two vacant regions;
   an anode gas diffusion layer disposed within each anode adhesive frame vacant region, wherein;
      each anode gas diffusion layer with the anode adhesive frame is situated between the anode electrode and the first major surface of the proton exchange membrane; and
      the anode adhesive frame forms a gas seal around each anode gas diffusion layer and between the anode electrode and the first major surface of the proton exchange membrane;
   a cathode electrode, the cathode electrode including a patterned metal layer with a plurality of apertures extending through the patterned metal layer; and
   a cathode adhesive frame including at least two vacant regions; and
   a cathode gas diffusion layer, wherein the cathode gas diffusion layer with the cathode adhesive frame is situated between the cathode electrode and the second major surface of the proton exchange membrane;
   a cathode gas diffusion layer disposed within each cathode adhesive frame vacant region, wherein:
      each cathode gas diffusion layer and the cathode adhesive frame are situated between the cathode electrode and the second major surface of the proton exchange membrane;
      the cathode adhesive frame forms a gas seal around each anode gas diffusion layer and between the cathode electrode and the second major surface of the proton exchange membrane; and
      the cathode adhesive frame adheres to the anode adhesive frame to form a gas seal disposed about each anode gas diffusion layer, the proton exchange membrane, and the cathode gas diffusion layer;
   wherein, the fuel cell assembly is arranged in a rolled configuration to define an inner cavity with open ends; and
   one or more end caps for covering the open ends.

10. The fuel cell assembly of claim 9 further comprising a fuel pellet disposed in the inner cavity.

11. The fuel cell assembly of claim 9, wherein when the fuel cell assembly is arranged in the rolled configuration, two opposing edges of the fuel cell assembly are secured together to define the inner cavity.

12. The fuel cell assembly of claim 11, wherein the two opposing edges of the fuel cell assembly are secured together by a weld bond.

13. The fuel cell assembly of claim 11, wherein the two opposing edges of the fuel cell assembly are secured together by an adhesive bond.

\* \* \* \* \*